UNITED STATES PATENT OFFICE.

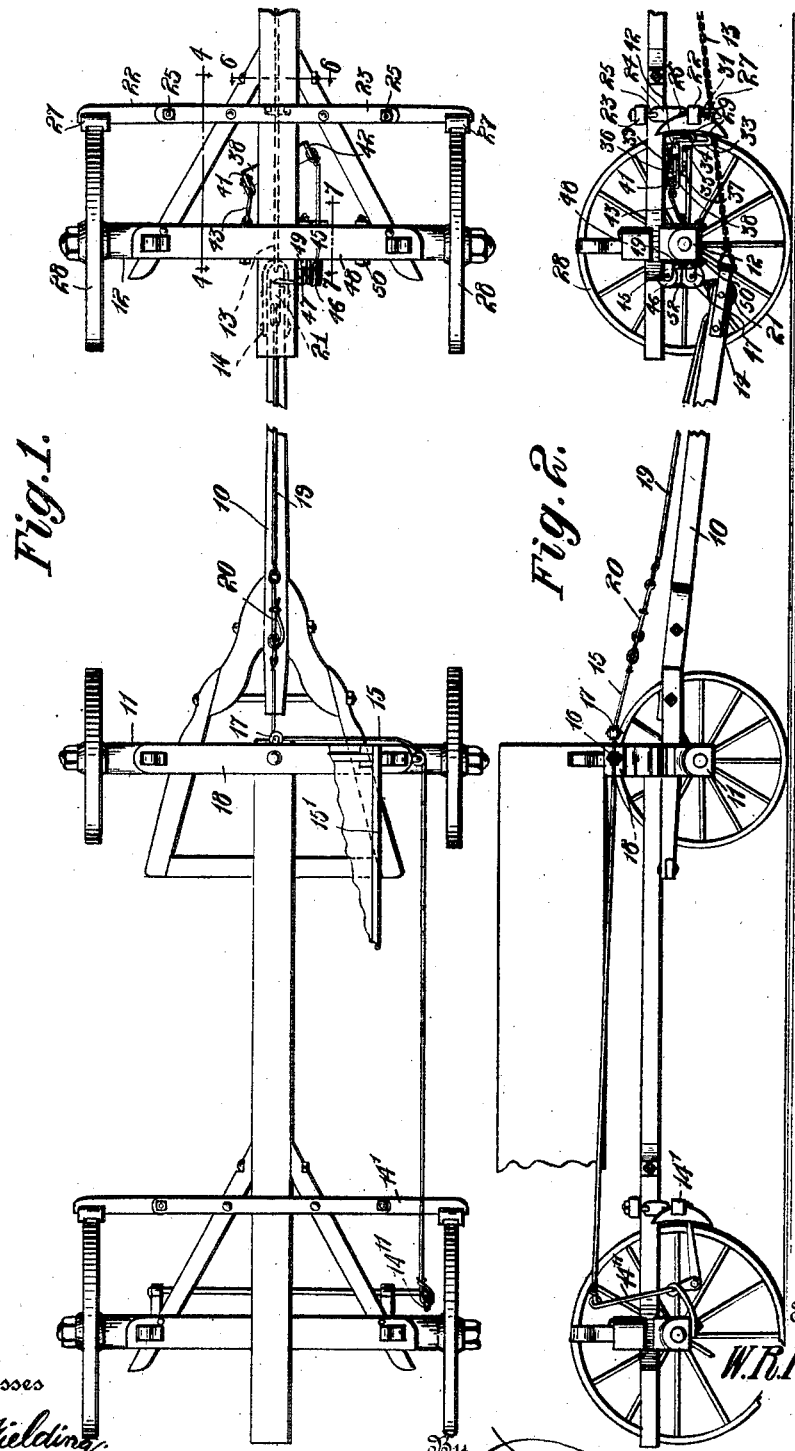

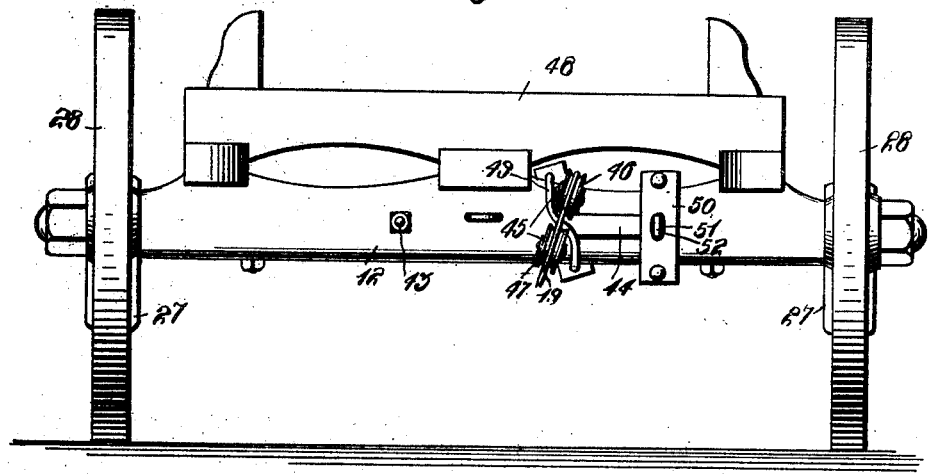

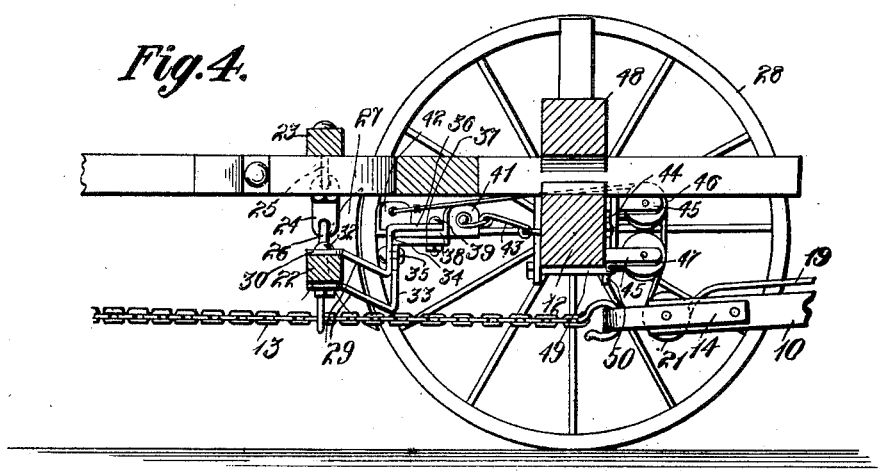
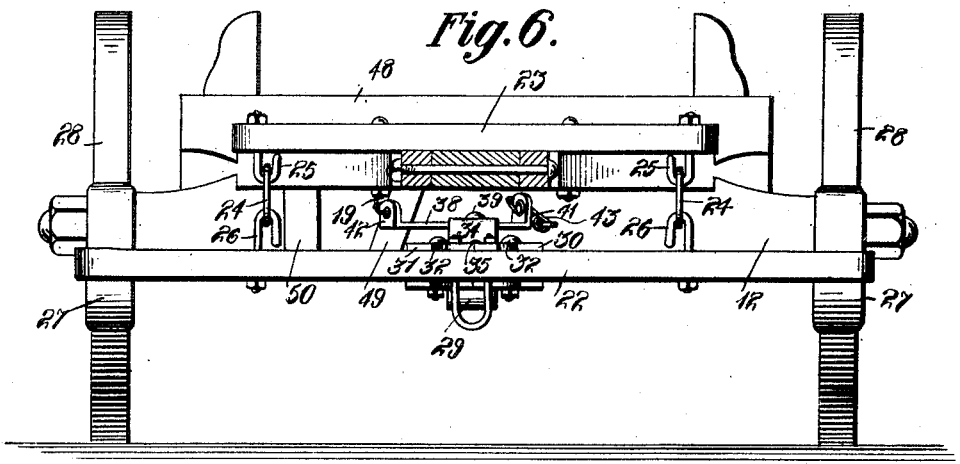
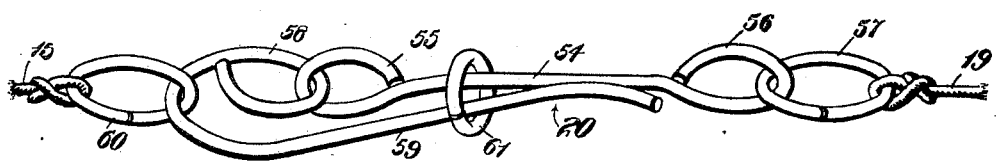

WILLIAM R. ROBINSON, OF MILTON, OREGON.

VEHICLE-BRAKE.

1,049,534.  Specification of Letters Patent.  Patented Jan. 7, 1913.

Application filed June 27, 1912. Serial No. 706,229.

*To all whom it may concern:*

Be it known that I, WILLIAM R. ROBINSON, a citizen of the United States, residing at Milton, in the county of Umatilla, State of Oregon, have invented certain new and useful Improvements in Vehicle-Brakes; and I do hereby declare the following to be a full, clear, and exact description of the invention, such as will enable others skilled in the art to which it appertains to make and use the same.

This invention relates to vehicle brakes and has for an object to provide a novel mechanism for automatically actuating the brake beams of a fore-wagon and trail wagon upon a down grade.

A further object of the invention is to provide a novel brake mechanism for the fore-wagon and trail wagon, the mechanism of both wagons being coupled together by a common cable which becomes taut upon a down grade and simultaneously the brake mechanisms of both wagons.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a plan view showing a fore-wagon and trail wagon equipped with my improvements. Fig. 2 is a side elevation of the parts shown in Fig. 1 with the near wheels removed. Fig. 3 is a rear elevation of the fore-wagon parts shown in Figs. 1 and 2. Fig. 4 is a cross sectional view taken on the line 4—4 Fig. 1. Fig. 5 is an enlarged plan view of the parts of the fore-wagon shown in Fig. 1 with the bolster removed and the reach broken away. Fig. 6 is a cross sectional view taken on the line 6—6 Fig. 1. Fig. 7 is a cross sectional view taken on the line 7—7 Fig. 1. Fig. 8 is a detail perspective view of the connecting link between the brake cables of the fore and trail wagons.

Referring now to the drawings in which like characters of reference designate similar parts, the tongue 10 of the front wheeled axle 11 of the trail wagon is held underneath the rear wheeled axle 12 of the fore-wagon by a draw chain 13, a U-shaped strap 14 arranged astride of the tongue tip serving to secure the chain to the tongue, this chain being normally taut upon level roads and upgrades and holding the tongue in the position shown, but becoming slack on a down grade and permitting of the tongue running forwardly beyond the axle 12. The forward end of the chain may be secured to the front axle of the fore-wagon or to any other part of the wagon body.

The brake beam 14' of the trail wagon rear wheels is of the usual kind provided with an upstanding actuating lever 14''. A cable 15 is trained through sheaves 16 and 17 on the trail wagon front bolster 18 and is thence led rearwardly along the trail wagon and terminally connected to the lever 14''. A forward pull upon this cable serves to set the brake beam 14'. The cable 15 is terminally connected to the brake beam actuating cable 19 of the fore-wagon by a link 20 which will be hereinafter more fully described, the cable 19 being trained under a sheave 21 journaled between the branches of the strap 14, and being connected at the forward end to the fore-wagon brake operating mechanism. The two connected cables 15 and 19 unite in forming a continuous limp connector between the brake beams of the fore and trail wagons, and by virtue of this connector being trained underneath the sheave 21, it will be seen that the cables are slack when the draw chain 13 is taut, on level ground and up grades, but upon the draw chain becoming slack on down grades with a resultant running forward of the tongue 10 underneath the fore-wagon, both cables will become taut with a corresponding forward pull upon the cable 15 and rearward pull upon the cable 19 with a resultant setting automatically of both brake beams on the trail and fore-wagon.

The brake beam actuating mechanism of the fore-wagon is of novel character and will now be fully described. A brake beam 22 is suspended from the hound bar 23 of the fore-wagon by means of links 24 at the opposite ends of the beam engaging with J-bolts 25 and 26 carried by the hound bar and brake beam respectively. The brake beam is equipped terminally with the usual shoes 27 for engagement with the rear wheels 28. The brake beam 22 is centrally interposed between brackets 29, which are provided with forked terminals 30 and 31 which bear upon the upper and lower faces of the brake beam and are rigidly secured thereto through the instrumentality of bolts 32 passed vertically through the parts. Both brackets extend rearwardly from the brake beam and are both offset upwardly intermediate the ends as shown at 33 and 34, both offset portions being secured tightly together by a bolt 35. Both brackets are extended rearwardly in parallelism above the offset portions as shown at 36 and 37. A lever 38 is pivotally secured intermediate the ends between the rearwardly extending portions 36 and 37 of the brackets by a pivot bolt 39, there being a plurality of openings 40 formed in the lever to permit of the lever being adjustably mounted on the pivot pin to vary the leverage. The lever is equipped with upturned ends 41 and 42, and the end 41 of the lever is secured to the rear axle 12 of the fore-wagon by a chain 43 or otherwise. The other end 42 of the lever is connected to the above mentioned brake operating cable 19. Upon the cable being pulled rearwardly by the tongue of the trail wagon running underneath the fore-wagon upon a down grade, the lever 38 will be rocked on its pivot and since one end of the lever is secured to the rear axle 12 of the fore-wagon, the brake beam will be pulled rearwardly and the brakes set.

For training the brake actuating cable 19 properly over the rear axle 12 of the fore wagon I provide a T-shaped bracket 44 the alined branches 45 of which extend substantially vertically upon the rear face of the axle and are equipped terminally with sheaves 46 and 47, the cable being passed under the bolster 48 and trained over the outer sides of the sheaves 46 and 47. A clip 49 is mounted on the rear axle, the bight of the clip being bent substantially S-shaped and bearing upon the outer face of the bracket 44 between the sheave, the clip straddling the bracket and securing the same at one end to the axle. A second clip 50 is secured to the axle and the bight of the clip is provided with an opening 51 which receives a projection 52 formed on the shank of the bracket 44, this clip anchoring the shank of the bracket to the axle.

In Fig. 8 the link connection 20 is shown to comprise a shank 54 which is terminally equipped with eyes 55 and 56, one of which receives the eye 57 of the cable 19 of the fore-wagon, and the other of which receives the securing eye 58 of a latch 59 which loosely projects through the terminal links 60 of the trail wagon cable 15. The latch extends along the shank and is normally held locked thereby by a ring 61 which encircles the shank and free end of the latch. Upon the ring being slid forwardly beyond the free end of the latch the latter may be rocked rearwardly and passed out of the trail wagon eye 60 to detach both cables from each other.

What is claimed, is:—

1. The combination of a fore-wagon, a trail wagon, a brake on the fore-wagon, a brake on the trail wagon, a continuous limp connector between both brakes, a draw chain connected to the fore-wagon and connected to the trail wagon, a sheave on the trail wagon tongue, said continuous connector being trained underneath said sheave, said connector being slack when said draw chain is taut, said connector being taut upon said draw chain becoming slack on down grades with a resultant rearward pull upon the fore-wagon brake and forward pull upon the trail wagon brake whereby to automatically set both of said brakes.

2. The combination with a fore-wagon and trail wagon and means connecting both wagons, of a brake beam loosely suspended from the fore-wagon, a bracket extending rearwardly from said beam, a lever pivoted intermediate its ends on said bracket, means connecting one end of said lever to said fore-wagon, a brake beam carried by said trail wagon, a sheave carried by the trail wagon tongue, and a cable connected to the free end of said lever and thence trained rearwardly under said sheave and connected to said trail wagon brake, said cable normally being slack but becoming taut on down grades with a resultant forward pull upon the trail wagon brake and rearward pull upon the fore wagon brake whereby to automatically set both of said brakes.

3. The combination with a fore wagon and a trail wagon, and means connecting both wagons, of a brake on said trail wagon, a sheave on the trail wagon tongue, a brake beam loosely suspended from said fore wagon, a rearwardly extending bracket on said brake beam, a lever adjustably pivoted intermediate the ends on said bracket, a connecting element anchoring one end of said lever to said fore wagon, a sheave mounted on the fore wagon rear axle, and a cable connected to the free end of said lever, thence trained over the sheave carried by the fore wagon rear axle, thence trained under the sheave carried by the trail wagon tongue, and thence connected to said trail wagon brake, said cable becoming taut on down grades with a resultant forward pull upon the trail wagon brake and rearward pull upon the fore wagon brake whereby to automatically set both of said brakes.

In testimony whereof, I affix my signature, in presence of two witnesses.

WILLIAM R. ROBINSON.

Witnesses:
C. R. SAMUEL,
T. C. FRAZIER.